United States Patent
Ross et al.

(10) Patent No.: US 11,352,033 B2
(45) Date of Patent: Jun. 7, 2022

(54) METHOD, SYSTEM, AND COMPUTER-READABLE MEDIUM COMPRISING SOFTWARE CODE FOR COMMUNICATING DATA FROM A TRANSMITTER TO A RECEIVER VIA A PHYSICAL TRANSMISSION MEDIUM, AND RELATED RAILWAY TRACK CIRCUIT

(71) Applicant: ALSTOM Transport Technologies, Saint Ouen (FR)

(72) Inventors: John Ross, Melbourne, FL (US); Jeffrey Fries, Grain Valley, MO (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 401 days.

(21) Appl. No.: 16/686,533

(22) Filed: Nov. 18, 2019

(65) Prior Publication Data
US 2021/0146972 A1  May 20, 2021

(51) Int. Cl.
*B61L 1/18* (2006.01)
*B61L 15/00* (2006.01)
*H04B 3/60* (2006.01)
*H04L 12/40* (2006.01)

(52) U.S. Cl.
CPC .......... *B61L 1/188* (2013.01); *B61L 15/0036* (2013.01); *B61L 15/0072* (2013.01); *H04B 3/60* (2013.01); *H04L 12/40* (2013.01); *H04L 2012/40293* (2013.01)

(58) Field of Classification Search
CPC .. B61L 1/188; B61L 15/0036; B61L 15/0072; H04B 3/60; H04L 12/40; H04L 2012/40293
See application file for complete search history.

(56) References Cited

U.S. PATENT DOCUMENTS

| | | | |
|---|---|---|---|
| 10,778,271 B1 * | 9/2020 | Casulli | B61L 1/187 |
| 2011/0268171 A1 * | 11/2011 | Lee | H04L 25/03038 375/229 |
| 2021/0146972 A1 * | 5/2021 | Ross | H04L 12/40 |

* cited by examiner

*Primary Examiner* — Jason C Smith
(74) *Attorney, Agent, or Firm* — Nixon & Vanderhye (57) ABSTRACT

Method and system for communicating data between a transmitter and a receiver via a physical transmission medium interposed there between, wherein the transmitter outputs over the transmission medium towards the receiver, a predefined precursor signal followed by a target signal carrying data packet. Based on the precursor signal received at the receiver, estimated values of actual electrical parameters of the physical transmission medium are computed via a predetermined model of the physical transmission medium, wherein the computed estimated values of the electrical parameters are indicative of a distortion caused by the physical transmission medium on the predefined precursor signal outputted by the transmitter. The data packets originally outputted by the transmitter are estimated based on the computed estimated values of the actual electrical parameters and on the target signal received at the receiver.

15 Claims, 5 Drawing Sheets

METHOD, SYSTEM, AND COMPUTER-READABLE MEDIUM COMPRISING SOFTWARE CODE FOR COMMUNICATING DATA FROM A TRANSMITTER TO A RECEIVER VIA A PHYSICAL TRANSMISSION MEDIUM, AND RELATED RAILWAY TRACK CIRCUIT

TECHNICAL FIELD

The present invention relates in general to the communication of data from a transmitter to a receiver via a physical transmission medium interposed there between, and more in particular to a method, a system, and computer-readable medium comprising software code for communicating data from a transmitter to a receiver via a physical transmission medium, and to a related railway track circuit.

The method, system, and software code for communicating data from a transmitter to a receiver via a physical transmission medium, according to the present disclosure, are particularly suitable for being used in connection with railway lines, and they will be described in the following by making reference to such applications, and in particular in relation to a railway track circuit, without intending in any way to limit their possible ambit of application and use.

BACKGROUND OF THE DISCLOSURE

As known, when transmitting signals from a transmission source to a remote receiving destination, the signals are usually subject to disturbances and distortions caused by the transmission medium used, as well as by the environment around the transmission medium itself. As a consequence, depending on the level of distortion, it can become very difficult, if not impossible, to properly receive and correctly interpret the informative content carried out by the transmitted signals, and this usually causes a series of technical inconvenient and operational issues or limitations.

For example, in the field of railway applications, it is known the use of track circuits, namely systems performing critical safety functions in the monitoring and management of traffic over a railway network. In particular, rail track circuits are primarily used to detect whether a train is present on a track section; they can be also used to detect broken rails within the track section, and/or to transmit signal aspect information through the rails, for example to communicate movement authorities of transiting trains.

To this end, track circuits use electrical signals applied to the rails and a typical track circuit includes a certain number of rails, forming a given track section, which are in electrical series with a signal transmitter and a signal receiver, usually positioned at respective ends of the given track section. The signal transmitter applies a voltage, to the rails which therefore constitute the physical transmitting medium or channel; as a result, a current signal is transmitted through the rails and is detected by the receiver.

A main issue related to track circuits resides in the fact that they are sensitive to operational and environmental conditions that impact the initial electrical characteristics of the relevant track section. In particular, over time, environmental conditions and rail conditions can change and, for example, these changing conditions impact the ballast electrical resistance between the rails of the track circuit. As a consequence, leakage paths occur through the ballast, and even the leakage resistance of such leakage paths varies due to the changing conditions, thus impacting on the values of the receive current and therefore negatively influencing the possibility of correctly receiving and interpreting the data received.

Due to this fact, the communication potential of track circuits, particularly those of long distance, for example where the transmitter and the receiver are spaced apart of about 4-7 km, has been limited to communicating just a few bits of information per second due to the distortion caused by the electrical parameters of the transmission medium, e.g. the track section of the track circuit itself. This is due to the fact that response time requirements of the track circuit restrict the amount of time during which data can be sent, and if the data rate were increased, the distortions caused by the transmission medium would also increase.

This constrains the amount of signalling and diagnostic information that can be sent in a reasonable amount of time and therefore limits substantially the potential, use of and functions performed by such circuits. For example, nowadays track circuits are used only for sending a handful number of signal aspects, e.g. from five to ten, carrying very basic diagnostic data, such as open signal lamp filaments, broken rails, AC mains power loss, and the like.

BRIEF DESCRIPTION OF THE INVENTION

Hence, it is evident that there is room and desire for improvements in the way data are communicated from a transmitter to a receiver via a physical transmission medium interposed there between.

The present disclosure is aimed at providing a solution to this end and, in one aspect, it provides a method for communicating data between a transmitter and a receiver via a physical transmission medium interposed there between, the method comprising at least the following steps:

outputting, by the transmitter over said transmission medium towards the receiver, a predefined precursor signal followed by a target signal carrying at least one data packet;

based on the precursor signal received at the receiver, computing estimated values of one or more actual electrical parameters of the physical transmission medium via a predetermined model of the physical transmission medium, wherein the computed estimated values of said one or more actual electrical parameters are indicative of a distortion caused by the physical transmission medium on the predefined precursor signal outputted by the transmitter;

estimating the at least one data packet originally outputted by the transmitter based on at least the computed estimated values of the one or more actual electrical parameters of the physical transmission medium and the target signal received at the receiver.

In another aspect, the present disclosure provides a system for communicating data, comprising at least:

a transmitter;

a receiver;

a physical transmission medium which is interposed between the transmitter and the receiver and is suitable to transmit signals outputted by the transmitter to the receiver; and a controller;

wherein the transmitter is configured to transmit over said transmission medium towards the receiver, a predefined precursor signal followed by a target signal carrying at least one data packet; and wherein the controller is configured to compute, based on the precursor signal received at the receiver, estimated values of one or more actual electrical parameters of the physical transmission medium via a predetermined model of the physical transmission medium, the computed estimated values of said one or more actual electrical parameters being indicative of a distortion caused by the physical transmission medium on the predefined precursor signal outputted by the transmitter, the controller being further configured to estimate the at least one data packet originally outputted by the transmitter based on at least the computed estimated values of the one or more actual electrical parameters of the physical transmission medium and the target signal received at the receiver.

In a further aspect, the present disclosure provides a track circuit for a railway line comprising:

a plurality of rails coupled to form a track section having a predefined length;

a transmitter coupled to the track section at a first end of the track section, the transmitter being configured to output over said track section a predefined precursor signal followed by a target signal carrying at least one data packet;

a receiver coupled to the track section at a second end of the track section, the receiver being configured to receive the precursor signal followed by the target signal outputted by the transmitter and transmitted via the track section;

a controller configured to compute, based on the precursor signal received at the receiver, estimated values of one or more actual electrical parameters of the track section via a predetermined model of the track section, the computed estimated values of said one or more actual electrical parameters being indicative of a distortion caused by the track section on the predefined precursor signal outputted by the transmitter, the controller being further configured to estimate the at least one data packet originally outputted by the transmitter based on at least the computed estimated values of the one or more actual electrical parameters of the track section and the target signal received at the receiver.

The present disclosure also provides a computer-readable medium comprising software code stored therein, the stored software code, when executed by a processor, executing or causing execute at least the following instructions:

outputting, by a transmitter over a transmission medium towards a receiver, a predefined precursor signal followed by a target signal carrying at least one data packet;

based on the precursor signal received at the receiver, computing estimated values of one or more actual electrical parameters of the physical transmission medium via a predetermined model of the physical transmission medium, wherein the computed estimated values of said one or more actual electrical parameters are indicative of a distortion caused by the physical transmission medium on the predefined precursor signal output by the transmitter;

estimating the at least one data packet originally outputted by the transmitter based on at least the computed estimated values of the one or more actual electrical parameters of the physical transmission medium and the target signal received at the receiver.

BRIEF DESCRIPTION OF THE DRAWINGS

Detailed characteristics and advantages will become apparent from the description of some preferred but not exclusive exemplary embodiments of a method, a system, a computer-readable medium comprising software code and related track circuit, according to the present disclosure, illustrated only by way of non-limitative examples with the accompanying drawings, wherein.

DETAILED DESCRIPTION OF THE DISCLOSURE

It should be noted that in the detailed description that follows, identical or similar components, either from a structural and/or functional point of view, may have the same reference numerals, regardless of whether they are shown in different embodiments of the present disclosure. It should be also noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration and/or form and/or positioning. In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

Figure 1:
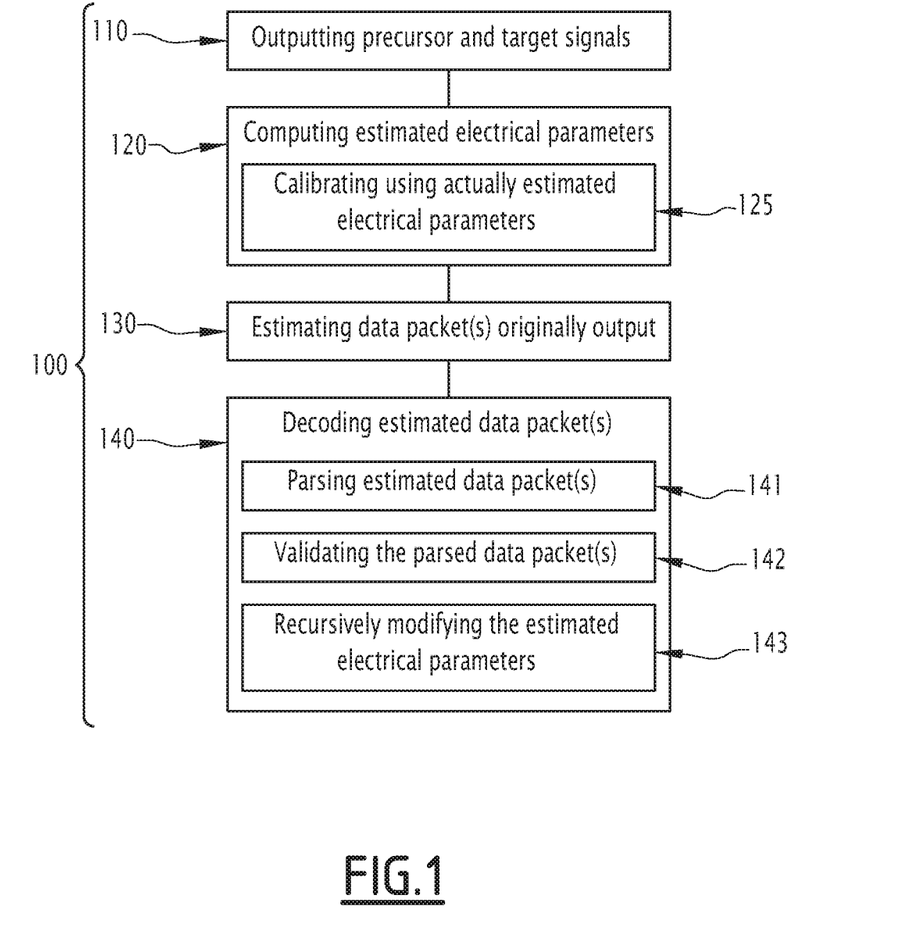
FIG. 1 is a flowchart depicting a method for communicating data from a transmitter to a receiver via a physical transmission medium, according to the present disclosure.
Figure 2:
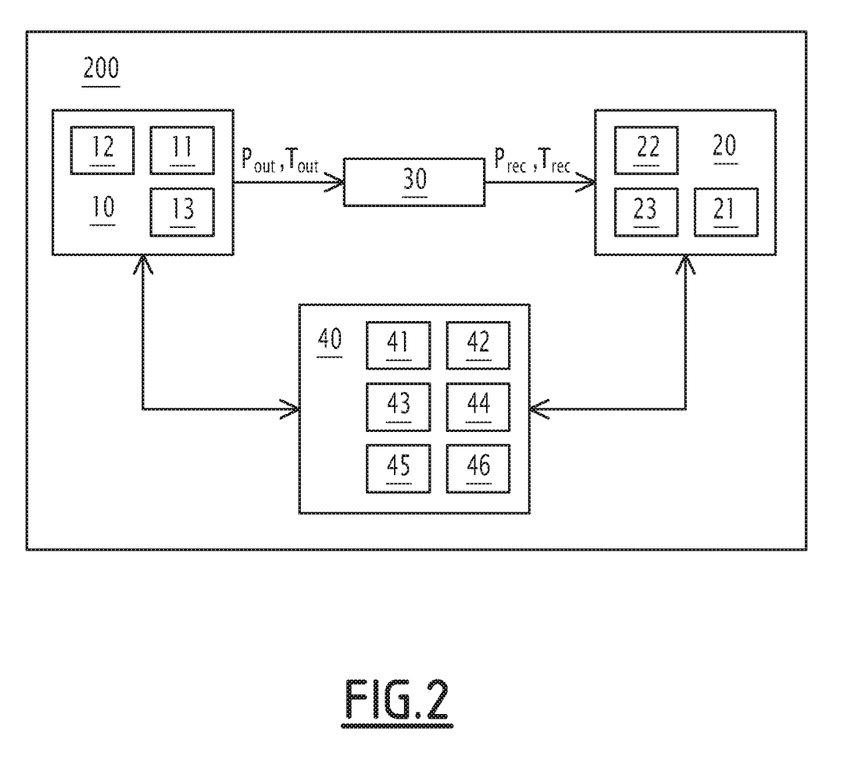
FIG. 2 is a block diagram schematically illustrating a system for communicating data from a transmitter to a receiver via a physical transmission medium, according to the present disclosure.

A method and a corresponding system for communicating data according to the present disclosure are illustrated in FIG. 1 and in FIG. 2, respectively, and therein indicated by the corresponding overall reference numbers 100 and 200.

As illustrated in FIG. 1, the method 100 comprises a first phase 110 of outputting, a predefined precursor signal $P_{out}$ followed by a target signal $T_{out}$ carrying at least one data packet; in particular, as illustrated in FIG. 2, the predefined precursor signal $P_{out}$ followed by a target signal $T_{out}$ are outputted by a transmitter 10 and transmitted to an associated receiver 20 over a transmission medium 30 towards an associated receiver 20 via a physical transmission medium interposed there between 30. The data packet carries for example movement authority information, such as signal aspect, and/or data related to the direction of traffic, and/or diagnostic information such as voltage/current values at one end of the track circuit, and/or data related to ballast conditions, and/or maintenance alarms such as failed signal lamp or loss of power, et cetera.

As further illustrated in FIG. 1, the method 100 comprises also the following phases:

120: computing, based on the precursor signal $P_{rec}$ received at the receiver 20, estimated values of one or more actual electrical parameters of the physical transmission medium 30 via a predetermined model of the physical transmission medium 30, wherein the estimated computed values of the one or more actual electrical parameters are indicative of a distortion caused by the physical transmission medium 30 on the predefined precursor signal $P_{out}$ outputted by the transmitter 10;

130: estimating the at least one data packet carried out by the target signal $T_{out}$ originally outputted by the transmitter 10, based on at least the estimated computed values of the one or more actual electrical parameters of the physical transmission medium 30, applicable to the predetermined model, and the target signal $T_{rec}$ received at the receiver 20 carrying the at least one data packet.

In an embodiment, and as illustrated in FIG. 1, the method 100 comprises a further phase 140 of decoding the estimated at least one data packet originally outputted by the transmitter 10.

In one possible embodiment of the method 100 according to the present disclosure, the predefined precursor signal $P_{out}$ outputted by the transmitter 10 carries out information independent from the at least one data packet carried out by the target signal $T_{out}$ also outputted by the transmitter 10. In particular, according to a possible embodiment, the predefined outputted precursor signal has, preferentially, a different frequency spectrum than the data packet.

Figure 4:
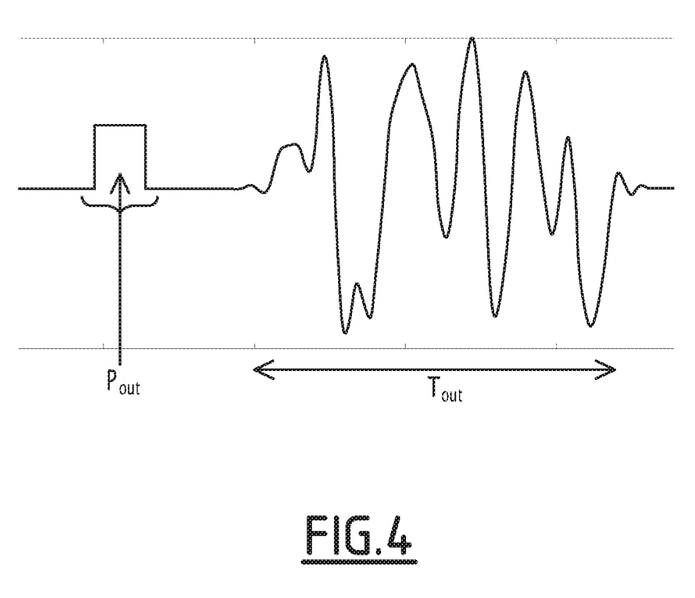
FIG. 4 is schematic graphical illustration of a signal layout outputted by a transmitter according to an exemplary embodiment of the present disclosure.

In particular, the predefined precursor signal $P_{out}$ and the target signal $T_{out}$ outputted by the transmitter 10 have corresponding shapes different from each other, as for instance illustrated in the exemplary layout signal depicted in FIG. 4.

Figure 3:
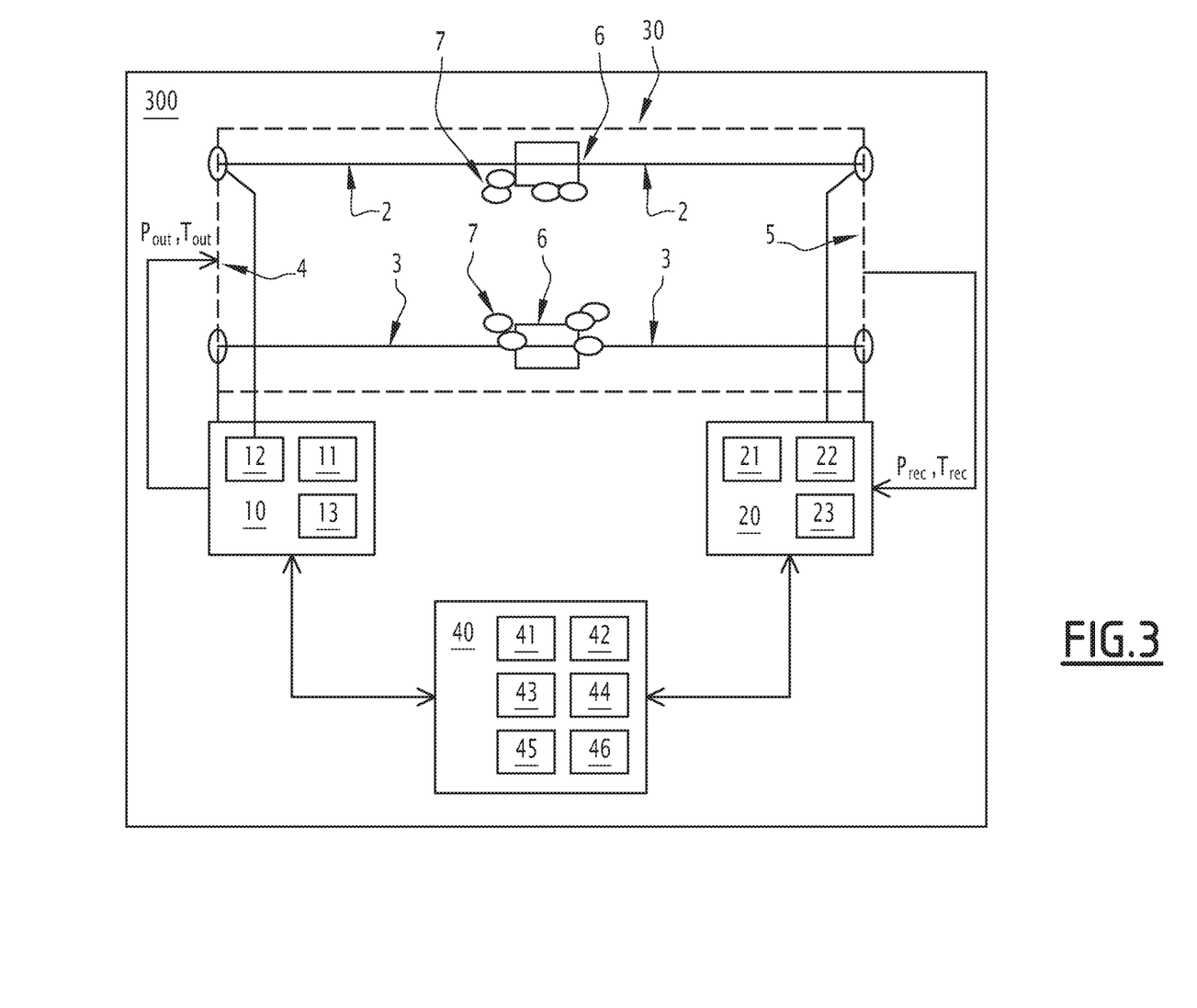
FIG. 3 schematically shows a track circuit of a railway line, according to an exemplary embodiment of the present disclosure.

For example, the precursor signal outputted $P_{out}$ can be the illustrated DC pulse of short duration and for instance in the case of a track circuit of the type illustrated in FIG. 3 by the reference number 300, the precursor signal or pulse $P_{out}$ may be similar to the type of or even the same signals of coded DC track circuits used currently for detecting the presence of a train, and/or for detecting a broken rail or broken mechanical insulated joints, and/or for communicating some basic signal/diagnostic data. Clearly, the shape of the precursor signal $P_{out}$ can be different, provided that is of prefixed and known type for the scope it is used in the frame of the present disclosure.

In turn, the data packet carrying signal $T_{out}$ can be for example represented by one or more DC pulses and contains more complex signal/diagnostic data.

In one possible embodiment of the method 100 according to the present disclosure, the step 120 of computing estimated values of one or more actual electrical parameters comprises computing estimated values of one or more actual electrical parameters of the physical transmission medium 30 by modifying in real time one or more parameter settings of the predetermined model of the physical transmission medium and correspondingly calculating one or more simulated received precursor signals in order to match the precursor signal $P_{rec}$ received at the receiver 20 with one of the simulated received precursor signals.

In one alternative embodiment of the method 100 according to the present disclosure, the 120 step of computing estimated values of one or more actual electrical parameters comprises comparing the actual precursor signal $P_{rec}$ received at the receiver 20 with a list or table of predefined received precursor signals $P_{rec}$ pre-computed by using the predetermined model of the physical transmission medium 30. Such list of table can be built for example by using an offline simulation tool with a defined precursor as the input, to generate many different responses, i.e. simulated precursor signals received at a receiver 20. The list or table is digitized and stored in a repository or memory unit of the system 200.

According to a possible embodiment of the method 100, the step of estimating the at least one data packet originally outputted by the transmitter 10 comprises applying at least one corrective coefficient indicative of a further distortion caused to the transmitted signal $P_{rec}$ and/or to data packet by environmental noise external to and associated with the physical transmission medium 30. For example, this at least one corrective coefficient has a predetermined constant value or has a value selected from pre-estimated values based on sampled signals received at the receiver 20 and calculated for example during a simulation/test phase. In this way, the reconstruction of the original data packet(s) transmitted can be further refined.

According to a possible embodiment of the method 100, the step 140 of decoding the estimated at least one data packet originally outputted by the transmitter 10 comprises a first sub-step 141 of parsing the estimated at least one data packet into a plurality of digital bits indicative of the data, and in particular of the information content thereof, initially outputted by the transmitter 10.

Figure 5:
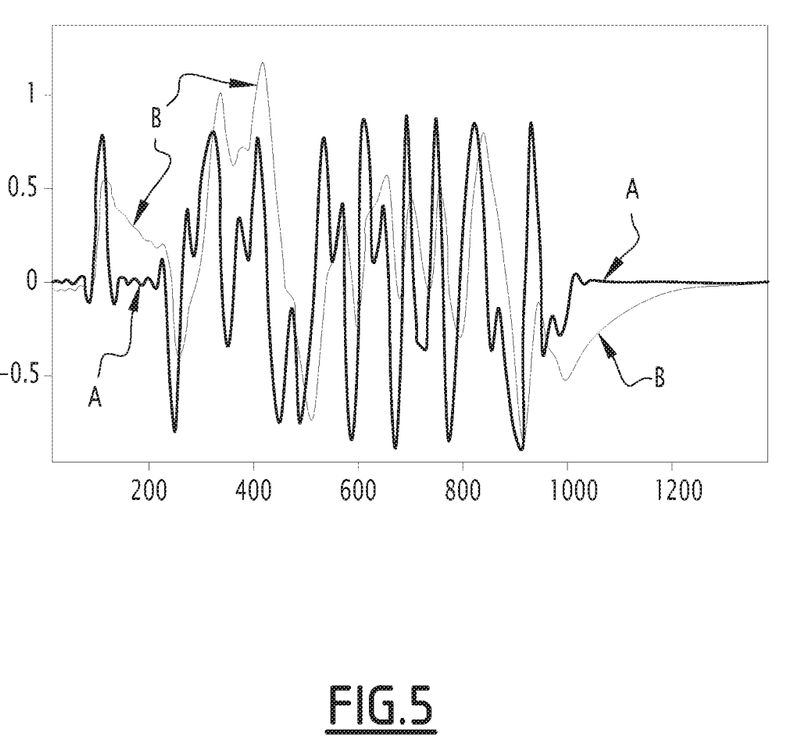
FIG. 5 shows a graphical comparison between a signal outputted by a transmitter and the distorted signal received at an associated receiver.

In one possible embodiment of the method 100, the step 140 of decoding further comprises a second sub-step 142 of validating the decoded and parsed out estimated at least one data packet originally outputted by the transmitter 10 by re-computing the CRC of the received at least one data packet and comparing them with the estimated at least one data packet parsed into a plurality of digital bits. It should be noted that other integrity checking mechanisms may be used in place of the CRC, such as HMAC, et cetera. Usefully, if the sub-step 142 of validating fails, the method 100 further comprises a third sub-step 143 of recursively modifying the estimated values of the one or more actual electrical parameters of the physical transmission medium until the second sub-step 142 of validating succeeds, namely it yields a non-failure result. In this way, it is possible to reverse, at least partially, the effects of distortions introduced by the transmission medium 30 and in case by the environment around the transmission medium itself. Indeed, such distortions may be significant, as for example illustrated in FIG. 5 where the curve A shows an exemplary signal layout originally outputted by a transmitter 10 and the curve B shows the distortions caused to it. In addition, such distortions may change in connection with changes of the electrical parameters of the transmission medium 30.

According to a possible embodiment and as illustrated in FIG. 2, the system 200 further comprises a controller 40 which is configured to perform the previously described steps 120, 130 and 140 including any related sub-step, and in particular to compute, based on the precursor signal $P_{rec}$ received at the receiver 20, estimated values of one or more actual electrical parameters of the physical transmission medium 30 via a predetermined model of the physical transmission medium itself, wherein the computed estimated values of the one or more actual electrical parameters are indicative of a distortion caused by the physical transmission medium 30 on the predefined precursor signal outputted by the transmitter 10. The controller is also further configured to estimate the at least one data packet originally outputted by the transmitter 10 based on at least the estimated computed values of the one or more actual electrical parameters of the physical transmission medium 30, applicable to the predetermined model, and on the data packet carrying signal $T_{rec}$ received at the receiver, and then to decode the estimated at least one data packet originally outputted by the transmitter 30.

The controller 40 can comprise or be constituted by any processor-based device, e.g. a microprocessor, microcontroller, a microcomputer, a programmable logic controller, an application specific integrated circuit, or any other programmable circuit, indicated in FIG. 2 by the reference number 41. Therefore, the term processor, as used herein, is not limited to just those integrated circuits referred to in the art as computers, but broadly refers to microprocessors, microcontrollers, microcomputers, programmable logic controllers, application specific integrated circuits, and other programmable circuits, and these terms are used interchangeably herein. Further, the controller 40 can comprise a storage unit or repository 42, e. g. a memory, for storing the determined list or table of precursor signals, a module 43 for estimating the electrical parameters, a communication module 44 for communicating outside, for example with the receiver 20 and/or the transmitter 10.

Further, the controller 40 can comprise a data decoder module 45 which parses the data packet(s) received into its various digital bits in order to determine what information was transmitted, and a checking module 46 for carrying out the above described validity check. For example, the checking module 46 recomputes the parsed out data, for example the CRC code of the parsed out data, over the estimated data bits. If the CRC codes match the ones determined as received, then the interpretation of the data bits is declared correct. If instead they are not matching, then the controller 40 recursively modifies the previously estimated values of the one or more actual electrical parameters of the physical transmission medium 30 until the second sub-step 142 of validating succeeds, namely the checking module 46 yields a non-failure result. For instance, the recursive modification of the previously estimated electrical parameters can be executed via timing or gain adjustments, and then the data decoder module 45 attempts to decode the data packet(s) received again. After a predetermined number of retries, the recursive modification will eventually terminate.

As those skilled in the art can easily appreciate, the estimating module 43, the data decoder module 45 and the validity check module 46 can be part of or separately associated with the processor 41, and can comprise suitable software and any needed related circuitry according to solutions readily available. It should also be noted that, in applications where data must be transmitted in both directions, for example to support bidirectional train traffic on the same track, each end of the track circuit may contain a transmitter 10, a receiver 20 and a controller 40.

FIG. 3 illustrates an exemplary embodiment of a system 200 in the form of a track circuit, indicated by the overall number reference 300 and suitable to be coupled to a railway line. The illustrated track circuit 300 comprises a track section 1 having a predetermined overall length L. The track section 30 comprises a plurality of rails 2 and 3, the rails 2 and the rails 3 being arranged in parallel to form the track section 30 on which a railway vehicle can run and the rails 2 and the rails 3 being respectively coupled in series. The rails 2 and the rails 3 form the track section 30, and have a first end 4 and a second opposite end 5. For ease of illustration, in FIG. 3 there are illustrated only two rails 2 and two corresponding rails 3.

According to solutions well known in the art and therefore not described herein in details, the rails 2 and the rails 3 are respectively coupled to each other in sequence, for example by means of fishplates, schematically represented in FIG. 3 by the reference number 6. The rails 2 are attached to the rails 3 through ties, which are laid in the ground and substantially covered with ballast, i.e. small stones, to hold the ties in place. In FIG. 3, the ballast has been represented by the reference number 7 only at a small area just for ease of illustration.

As illustrated, the track circuit 300 comprises a transmitter 10 which is coupled to the track section 30, for example at or adjacent to the first end 4, and a receiver 20. The transmitter 10 is adapted to output, inter alia, the previously described precursor signal $P_{out}$ and the target signal carrying the at least one data packet $T_{out}$ towards the receiver 20 via the interposed physical transmission medium constituted in this case by the track section 30. For example, the transmitter 10 comprises an energy source 11 and suitable circuitry 12, adapted to generate and apply to the track section 30 the described signals $P_{out}$ and $T_{out}$. In turn, the receiver 20 can comprise an energy source 21 and suitable circuitry 22 for the reception of the previously described received precursor signal $P_{REC}$ and received target signal $T_{REC}$. The transmitter 10 and receiver 20 can comprise each a corresponding communication module, e.g. a respective transceiver 13 and 23, respectively, in data communication with each other.

The track circuit 300 further comprises a controller 40 configured to compute, based on the precursor signal $P_{REC}$ received at the receiver, estimated values of one or more actual electrical parameters of the physical transmission medium, namely of the track section 30, via a predetermined model of the physical transmission medium itself, wherein the computed estimated values of the one or more actual electrical parameters are indicative of a distortion caused by the track section 30 on the predefined precursor signal $P_{out}$ outputted by the transmitter 10. In particular, the controller 40 is further configured to estimate the at least one data packet originally outputted by the transmitter 10 based on at least the estimated computed values of the one or more actual electrical parameters of the track section 30, as applicable to the predetermined model, and the data packet carrying signal $T_{rec}$ received at the receiver 20, and the to decode the estimated at least one data packet originally outputted by the transmitter 10.

Accordingly, when the physical transmission medium 30 is constituted by the track section 1 of a track circuit 300 comprising also the transmitter 10 and the receiver 20, in one possible embodiment of the method 100 according to the present disclosure, the step 120 of computing estimated values of one or more actual electrical parameters of the physical transmission medium 30 comprises computing one or more actual electrical parameters of the group comprising an electrical resistance of ballast associated with the track section 30 of the track circuit 300, the electrical resistance and the electrical inductance of the track section 30, and in particular of the rails 2-3 forming the track section 30, the electrical resistance of one or more wires of the track circuit, for example those for connecting the transmitter 10 and the receiver 20 to the respective ends 4 and 5 of the track section 1, the electrical capacitance of the track section 30.

Further, according to this embodiment, once the estimated actual electrical parameters of the track section 30 have been computed, the method 100 further comprises a step 125 of calibrating the track circuit 300, and in particular the parts related to the track section 30, based on the estimated actually computed electrical parameters. This calibration can be triggered by an operator or can be automatic, and in any case it contributes advantageously to avoid or at least reduce maintenance actions and unreliability of the track circuit 300 as a whole.

As those skilled in the art would appreciate and based on the foregoing description, the above-described embodiments of the disclosure may be implemented using computer programming including computer software, firmware, hardware or any combination or subset thereof, wherein the technical effect is to communicate data via output signals, reverse the signals received and reconstruct the data originally outputted via the output signals. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network. In practice the devised code includes software instructions which, once executed by a processor, carry out and/or cause suitable machinery and/or equipment, to carry out the various steps of a method 100 as described in the foregoing description, and in particular as defined in the appended relevant claims.

Hence, it is evident that the method 100, the system 200, the rail track circuit 300, as well as the indicated software code, according to the present disclosure, enable to communicate more complex signal and diagnostic data compared with the actual state of the art, since the distortions caused by the transmission medium and optionally by environmental power noise can be conveniently reversed. In this way it is possible to increase the number of monitored conditions, to add more clarifying data regarding failures for faster service restoration, for example for the localization of a broken rail, to trend the health of the transmission medium conditions in real time. In this way it is possible to perform more services and in a more efficient and effective way. For instance, in case of track circuits, it would be possible to execute real time health monitoring and predictive maintenance operations.

These results are obtained with a solution relatively easy to be implemented where the characteristics of the communication channel or medium are estimated very quickly, and in an adaptable way when the conditions of the transmission medium itself change.

The method 100, system 200, rail track circuit 300 and related software code thus conceived are susceptible of modifications and variations, all of which are within the scope of the inventive concept as defined in particular by the appended claims; for example, some parts of the control system 200, e.g. one or more of the described modules, may reside on the same electronic unit, or they can be realized as subparts of a same component or circuit of an electronic unit, or they can be placed remotely from each other and in operative communication there between; the controller 40 or parts thereof can be associated with the receiver 20 and/or the transmitter 10. All the details may furthermore be replaced with technically equivalent elements.

What is claimed is:

1. A method for communicating data between a transmitter and a receiver via a physical transmission medium interposed there between, the method comprising at least the following steps:

outputting, by the transmitter over said transmission medium towards the receiver, a predefined precursor signal followed by a target signal carrying at least one data packet;

based on the precursor signal received at the receiver, computing estimated values of one or more actual electrical parameters of the physical transmission medium via a predetermined model of the physical transmission medium, wherein the computed estimated values of said one or more actual electrical parameters are indicative of a distortion caused by the physical transmission medium on the predefined precursor signal outputted by the transmitter;

estimating the at least one data packet originally outputted by the transmitter based on at least the computed estimated values of the one or more actual electrical parameters of the physical transmission medium and the target signal received at the receiver.

2. The method for communicating data according to claim 1, wherein said step of computing estimated values of one or more actual electrical parameters comprises computing estimated values of one or more actual electrical parameters of the physical transmission medium by modifying in real time one or more settings of the predetermined model of the physical transmission medium and correspondingly calculating one or more simulated received precursor signals in order to match the precursor signal received at the receiver with one of the simulated received precursor signals.

3. The method for communicating data according to claim 1, wherein said step of computing estimated values of one or more actual electrical parameters comprises comparing the actual precursor signal received at the receiver with a table of received predefined precursor signals pre-computed by using the predetermined model of the physical transmission medium.

4. The method for communicating data according to claim 1, wherein said step of estimating the at least one data packet originally outputted by the transmitter comprises applying at least one corrective coefficient indicative of a further distortion caused, by environmental noise external to and associated with the physical transmission medium, on the outputted predefined precursor signal and/or data packet.

5. The method for communicating data according to claim 1, wherein the predefined precursor signal carries information independent from the at least one data packet carried by the target signal.

6. The method for communicating data according to claim 1, wherein the predefined precursor signal and the target signal have corresponding shapes different from each other, the precursor signal having preferentially a different frequency spectrum than the target signal.

7. The method for communicating data according to claim 1, wherein it comprises at least the further step of:

decoding the estimated at least one data packet originally outputted by the transmitter.

8. The method for communicating data according to claim 7, wherein said step of decoding the estimated at least one data packet originally outputted by the transmitter comprises a first sub-step of parsing the estimated at least one data packet into a plurality of digital bits indicative of the data content outputted by the transmitter.

9. The method for communicating data according to claim 8, wherein said step of decoding further comprises a second sub-step of validating the decoded estimated at least one data packet originally outputted by the transmitter and wherein, if the sub-step of validating fails, it further comprises recursively modifying the estimated values of the one or more actual electrical parameters of the physical transmission medium until the sub-step of validating succeeds.

10. The method for communicating data according to claim 1, wherein said physical transmission medium include a track section of a track circuit comprising said transmitter and said receiver, said track section being formed by a plurality of rails, and wherein said step of computing estimated values of one or more actual electrical parameters of the physical transmission medium comprises computing one or more electrical parameters of the group comprising an electrical resistance of ballast associated with the track section, the electrical resistance of the rails forming the track section, the electrical inductance of the rails forming the track section, the electrical resistance of one or more wires of the track circuit, the electrical capacitance of the track section.

11. The method for communicating data according to claim 10, wherein said step of outputting comprising using as the outputted predefined precursor signal a coded DC signal used by said track circuit for detecting the presence of a railway vehicle.

12. The method for communicating data according to claim 1, wherein it comprises a step of calibrating the track circuit based on the actually computed estimated electrical parameters.

13. A computer-readable medium comprising software code stored therein which, when executed by a processor, execute or make execute a method according to claim 1.

14. A system for communicating data, comprising at least:
a transmitter;
a receiver;
a physical transmission medium which is interposed between the transmitter and the receiver and is suitable to transmit signals outputted by the transmitter to the receiver; and
a controller;
wherein the transmitter is configured to transmit over said transmission medium towards the receiver, a predefined precursor signal followed by a target signal carrying at least one data packet; and
wherein the controller is configured to compute, based on the precursor signal received at the receiver, estimated values of one or more actual electrical parameters of the physical transmission medium via a predetermined model of the physical transmission medium, the computed estimated values of said one or more actual electrical parameters being indicative of a distortion caused by the physical transmission medium on the predefined precursor signal outputted by the transmitter, the controller being further configured to estimate the at least one data packet originally outputted by the transmitter based on at least the computed estimated values of the one or more actual electrical parameters of the physical transmission medium and the target signal received at the receiver.

15. A track circuit for a railway line, comprising at least:
a plurality of rails coupled to form a track section having a predefined length;
a transmitter coupled to the track section at a first end of the track section, the transmitter being configured to output over said track section a predefined precursor signal followed by a target signal carrying at least one data packet;
a receiver coupled to the track section at a second end of the track section, the receiver being configured to receive the precursor signal followed by the target signal outputted by the transmitter and transmitted via the track section;
a controller configured to compute, based on the precursor signal received at the receiver, estimated values of one or more actual electrical parameters of the track section via a predetermined model of the track section, the computed estimated values of said one or more actual electrical parameters being indicative of a distortion caused by the track section on the predefined precursor signal outputted by the transmitter, the controller being further configured to estimate the at least one data packet originally outputted by the transmitter based on at least the computed estimated values of the one or more actual electrical parameters of the track section and the target signal received at the receiver.

\* \* \* \* \*